United States Patent
Jacobowitz

(10) Patent No.: US 11,412,839 B2
(45) Date of Patent: Aug. 16, 2022

(54) PET PAW CLEANER HAVING HALO-ILLUMINATION LIGHTING

(71) Applicant: Just Fur Love, LLC, Boston, MA (US)

(72) Inventor: Naftoli Jacobowitz, New York, NY (US)

(73) Assignee: Just Fur Love, LLC, Boston, MA (US)

( * ) Notice: Subject to any disclaimer, the term of this patent is extended or adjusted under 35 U.S.C. 154(b) by 162 days.

(21) Appl. No.: 16/390,250

(22) Filed: Apr. 22, 2019

(65) Prior Publication Data

US 2019/0320787 A1 Oct. 24, 2019

Related U.S. Application Data

(60) Provisional application No. 62/660,951, filed on Apr. 21, 2018.

(51) Int. Cl.
*A46B 13/02* (2006.01)
*A46B 15/00* (2006.01)
*A01K 13/00* (2006.01)

(52) U.S. Cl.
CPC ........ *A46B 15/0036* (2013.01); *A01K 13/001* (2013.01); *A46B 13/02* (2013.01); *A46B 2200/1093* (2013.01)

(58) Field of Classification Search
CPC ........ A46B 2200/1093; A46B 15/0036; A46B 13/02; A61H 23/02
See application file for complete search history.

(56) References Cited

U.S. PATENT DOCUMENTS

2005/0251242 A1 * 11/2005 Bousfield ............. A61N 5/0617
607/150
2017/0367923 A1 * 12/2017 Bergbacka ............. A61H 7/001

* cited by examiner

*Primary Examiner* — Michael D Jennings
(74) *Attorney, Agent, or Firm* — Wolf, Greenfield & Sacks, P.C.

(57) ABSTRACT

Disclosed is a paw cleaning device for pet animals. The paw cleaning device of the present invention is an improved device for cleaning a pet's paws by providing a light source for adequate lighting during the cleaning process. The light source provides a halo-illumination lighting effect such that a 360-degree light encircles the paw, including particular regions of the paw being cleaned. The use of halo-illumination allows a user to see specific regions of the paw being cleaned, thus providing the user sufficient information about the health of the pet.

13 Claims, 7 Drawing Sheets

PET PAW CLEANER HAVING HALO-ILLUMINATION LIGHTING

CROSS-REFERENCE TO RELATED PATENT DOCUMENTS

This patent application claims the benefit of priority of U.S. Provisional Application No. 62/660,951, entitled "PET PAW CLEANER HAVING HALO-ILLUMINATION LIGHTING," filed Apr. 21, 2018, which are hereby incorporated herein by reference in its entirety

FIELD OF THE INVENTION

The present invention relates generally to handheld pet grooming devices and, more particularly, to a paw cleaning device for pet animals. The paw cleaning device includes halo-illumination lighting that can be used during cleaning process of the paw of the pet animals such as dogs and cats to effectively clean the paw and to visibly study health conditions of the pet animals.

BACKGROUND

There exists a substantial and growing commercial market for improved pet grooming tools due in part to pet owners' increasing awareness about the health benefits of maintaining a well-groomed and clean pet animal. One of the important category of pet grooming includes regular cleaning of pet animal paws. Clean pet animal paws prevents germs and dirt from being brought into a housing abode and also ensures a healthier pet animal.

Regular cleaning of pet animal paws enable pet owners and groomers to better maintain and understand the health condition of pet animals. If any diseases are associated with a pet animal, a disease may become apparent during cleaning pet animal paws. Some of key diseases include pillow foot which is linked to immunodeficiency virus that leads to swelling of paw pads of pets, Lick Granuloma that leads to hair loss and lesions in the front paws of pets, Pemphigus Foliaceus with Pustules and blisters (a type of skin related disease) formed on the paws of pets, diabetes that can lead to formation of sores in the paws of pets, and cancerous growth on the paws of pets.

There are several paw cleaning tools available in the market. However, a key problem with known paw cleaning tools is that most of the paw cleaning tools are passive, meaning the paws of the pet are to be placed into the tool for cleaning, rather than a tool being brought to the paws of the pet for active cleaning.

Some examples for such passive paw cleaning tools are described in US20190029224 and US20110239955. US20190029224 discloses a container type pet paw washer that includes three main parts, namely container, insert, and a top, which are assembled together to make it ready for operation. Once ready, the pet's paw is then inserted through the opening in the top and moved back and forth relative to the bristles within the container to clean the pet's paw. Likewise, US20110239955 discloses a two-piece dog paw cleaning device wherein a paw of the dog may be placed into the first tray member which contains water so that the paw may be cleaned with the paw of the dog then placed into the second tray member which includes a towel positioned therein to dry the paw of the dog.

Another issue with the existing paw cleaning tools is that they fail to provide adequate visibility of the paws of the pets. In other words, such tools do not provide lighting over the paws of the pets to allow the groomers to effectively view the paws of the pets during the cleaning procedure.

In light of the foregoing, there exists a need for a technically improved and more reliable solution that solves the above-mentioned problems. The present invention, therefore provides an improved pet grooming device that can be used to actively clean pet animal paws and at the same time visually study the health condition of a pet animal paws.

BRIEF SUMMARY

It is an objective of the present invention to provide a paw cleaning device or a paw cleaner for pet animals. The paw cleaner of the present invention is highly efficient and effective for cleaning a pet's paw as it provides adequate lighting during cleaning. In the present invention, the light source provides a halo-illumination lighting effect such that a 360-degree light encircles a specific region of the paw of the pet animal during cleaning. The use of halo-illumination allows a groomer to clearly see the regions of the pet's paw where the light is focused, thus providing the groomer sufficient information and evaluation about health conditions of the pet undergoing paw cleaning.

Embodiments of the present invention disclose a paw cleaning device for a pet animal. The device includes a body portion having at least one power switch and at least one light source switch, a light source portion for providing halo-illumination lighting, and a head portion comprising a bristle portion having a plurality of bristles, a base portion, and a connecting pin.

In an embodiment, the at least one power switch (such as a three-position switch) of the paw cleaning device can be operated by the user to control the movement or the rotational speed of bristles present on the head portion of the paw cleaning device. The three-position switch can be operated by the user to switch between three positions. In a first position of the three-position switch, the paw cleaning device is in an OFF state (i.e., the bristles do not move or rotate). In a second position of the three-position switch, the paw cleaning device is in an ON state (i.e., the bristles can move or rotate), and thus, the paw cleaning device may be used for cleaning the paw of the pet animal. In this position (i.e., the second position), the bristles present on the head portion move or rotate at a medium speed. In a third position of the three-position switch, the paw cleaning device is in an ON state (i.e., the bristles can move or rotate), and thus, the paw cleaner may be used for cleaning the paw of the pet animal. In this position (i.e., the third position), the bristles on the head portion rotate at a high speed. In an embodiment, the bristles are fixedly attached or extend upward from the bristle portion. In another embodiment, the bristles may be removably attached or extend upward from the bristle portion. In one embodiment, the bristle portion may be removably attached with the base portion. In another embodiment, the bristle portion may be fixedly attached with the base portion that connects the head portion to the body portion of the paw cleaning device.

In addition, the light source portion of the paw cleaning device comprises a light source for providing a 360-degree lighting effect that encircles a region of the pet's paw during cleaning of the paw of the pet animal such as a dog. The paw cleaner embodiment having a 360-degree light source for illuminating a specific region of the paw is very advantageous as the surfaces or regions of the paw to be cleaned are more clearly visible and distinguishable by the user. The paw cleaner further includes a light source switch. The light source switch may be operated by the user to turn ON or turn OFF one or more lights, such as one or more light emitting diodes ("LED's") located in the light source portion of the paw cleaner for illuminating specific regions of the paws of the pet animal. One such embodiment of the light source switch utilizes four modes of operation. In a first mode, when the light source switch is pressed by the user, a front half of the light source portion emits light such as by means of one or more LED's with halogen light. In a second mode, when the light source switch is pressed by the user, a rear half of the light source portion emits light such as by means of one or more LED's with halogen light. In a third mode, when the light source switch is pressed by the user, the entire light source portion emits light such as by means of one or more LED's with halogen light. In a fourth mode, when the light source switch is pressed by the user, the light source portion is turned OFF and does not emit any light.

These and other features and advantages of the present invention will become apparent from the detailed description below, in light of the accompanying drawings.

BRIEF DESCRIPTION OF THE ACCOMPANYING DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of various examples. It is expressly understood, however, that the drawings are for the purpose of illustration and description only and are not intended as a definition of the limits of the invention. Embodiments of this invention will now be described by way of example in association with the accompanying drawings in which:

Figure 1:
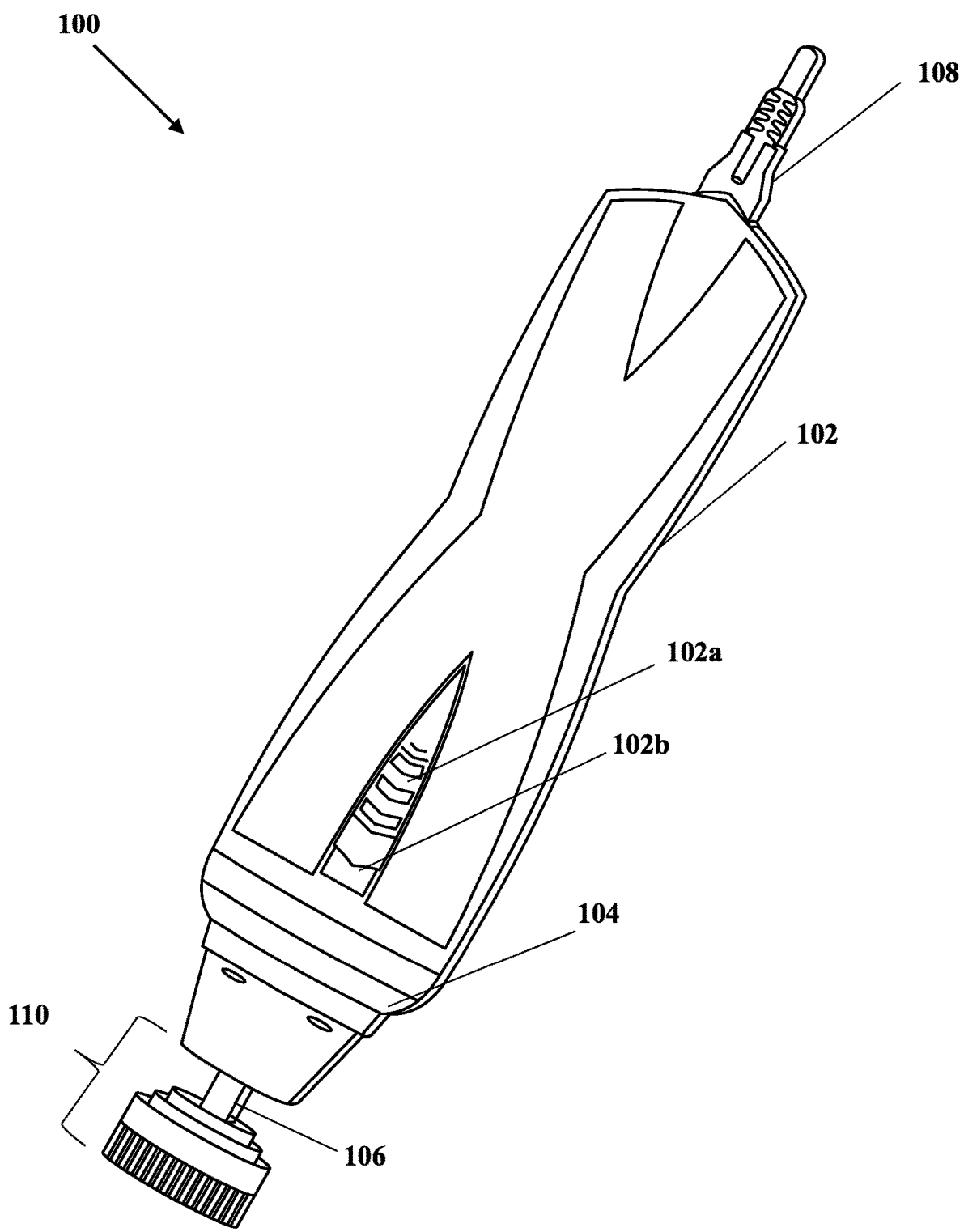
FIG. 1 illustrates a front view of a paw cleaning device, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of components, which constitutes a paw cleaner or paw cleaning device for pet animals. Accordingly, the components have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "one example", "an example", "another example", and so on, indicate that the embodiment (s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Techniques consistent with the present invention provide, among other features, a paw cleaning device for cleaning paws of pet animals. The paw cleaning device includes halo-illumination lighting that is used during the cleaning of the paws of the pet animals such as dogs. As used herein, the term "illumination" refers to the use of a light source to spotlight a particular area or object. The term "halo-illumination" refers to a light source capable of providing 360-degree lighting of an area or region or an object at the same time, whereas the light is provided on the periphery of the exuded light, and the center of the light does not provide any light. Further, in the context of present invention, terms such as "a user", "a pet owner", "a groomer", and so on are all interchangeably used.

Unless stated otherwise, terms such as "first", "second", "third", "fourth" are used to arbitrarily distinguish between the elements or entities. Thus, these terms are not necessarily intended to indicate temporal or other prioritization of such elements or priorities. While various exemplary embodiments of the disclosed systems and methods have been described above, it should be understood that they have been presented for purposes of example only, and not limitations. It is not exhaustive and does not limit the invention to the precise form disclosed. Modifications and variations are possible in light of the above teachings or may be acquired from practicing of the invention, without departing from the breadth or scope.

The paw cleaning device having halo-illumination lighting will now be described with reference to the accompanying figures, specifically FIGS. 1-7.

Referring to FIG. 1, a front view of a paw cleaning device 100 is shown. The device 100 includes a plurality of portions such as a body portion 102, a light source portion 104, and a head portion 110. In an embodiment, the body portion 102, the light source portion 104, and the head portion 110 are removably assembled or attached together to obtain the paw cleaning device 100.

In an embodiment, the body portion 102 (such as an upper body portion of the paw cleaning device 100) may be made of various materials, such as, but not limited to, plastic, aluminum, copper, steel or iron. The body portion 102 may include a power switch assembly 102a on its top i.e., on a front part of the body portion 102 as shown in FIG. 1. The power switch assembly 102a may include at least one power switch. The power switch may be an electrical switch, an electronic switch, a mechanical switch, or a combination thereof. In an exemplary embodiment, the power switch may be operated to activate or deactivate (i.e., to turn ON or turn OFF) the paw cleaning device 100. The power switch may also be operated to control the rotational speed or the movement of a head portion 110 including bristles 110c. The power switch may be operated along three positions such as a first position, a second position, and a third position. In the first position of the power switch, the device 100 remains in OFF condition (i.e., in deactivated mode), and the head portion 110 including bristles 110c does not rotate or move. In the second position of the power switch, the device 100 is turned ON (i.e., in activated mode), and the head portion 110 including bristles 110c rotates or moves, and operates at a medium speed. In the third position of the power switch, the device 100 remains turned ON, and the head portion 110 including bristles 110c rotates or moves, and operates at a high speed. Thus, the power switch of the power switch assembly 102a may be operated by a user to switch between at least the first position, the second position, and the third position to operate the device 100. In another exemplary embodiment, the power switch assembly 102a may include three power switches such as a first power switch, a second power switch, and a third power switch. The first power switch may be operated to turn OFF the device 100. The second power switch may be operated to turn ON the device 100 in which the head portion including bristles 110c operates and rotates at a medium speed. The third power switch may be operated to turn ON the device 100 and in which the head portion 110 including bristles 110c operates and rotates at a high speed.

In an embodiment, the body portion 102 may further include a light source switch 102b on its top i.e., on a front part of the body portion 102 as shown in FIG. 1. The light source switch 102b may be an electrical switch, an electronic switch, a mechanical switch, or a combination thereof. The light source switch 102b may be operated by the user to turn ON or turn OFF a lighting source, such as one or more light emitting diodes ("LED's" or a series of LED's) included in the light source portion 104 of the device 100. The light source switch 102b may be associated with at least four modes of operations. Each mode of operation may be activated by pressing or operating the light source switch 102b. In one example, with a first press of the light source switch 102b by the user, a front half of the light source portion 104 is illuminated (i.e., turns ON) and emits halogen light by means of one or more LED's (i.e., the front half of a panel of LED's lights up). Further, with a second press of the light source switch 102b by the user, a rear half of the light source portion 104 is illuminated (i.e., turns ON) and emits halogen light by means of one or more LED's (i.e., the back half of a panel of LED's lights up). Further, with a third press of the light source switch 102b by the user, the entire light source portion 104 is illuminated (i.e., turns ON) and emits halogen light by means of one or more LED's (i.e., the entire panel of LED's lights up). Further, with a fourth press of the light source switch 102b by the user, the light source portion 104 is no longer illuminated (i.e. turns OFF) and does not emit halogen light from any of the one or more LED's. In other embodiments, the light source portion 104 may be comprised of other light emitting means, such as incandescent or fluorescent type light sources.

In an embodiment, the head portion 110 is designed to allow the device 100 to perform cleaning of intended regions of the paws (such as for example paw pads) of the pets. The head portion 110 includes a bristle portion 110b having bristles 110c, a base portion 110a, and a connecting pin 106. In an embodiment, the bristle portion 110b having bristles 110c may be removably attached to the base portion 110a. In another embodiment, the bristle portion 110b may be fixedly attached to the base portion 110a. Further, the connecting pin 106 of the head portion 110 is configured to connect the head portion 110 over the top of the body portion 102, specifically, the connecting pin 106 attaches to the base portion 110a and either fixedly or removably connects the base portion 110a to an inner connector in the body portion 102 (such as a clip or a holding means such as a socket). The top head portion 110 including bristles 110c can be designed with appropriate dimensions suitable to allow the bristles 110c to effectively clean the various regions of paws such as gaps present in the paw pads and so on. In one embodiment, the top head portion 110 (consisting of the bristles portion 110b and the base portion 110a) is made circular disc like with appropriate diameter complementing the width of the body portion 102 such as not to obstruct the lighting from the light source portion 104. However, it should also be understood that variety of other shapes for the head portion 110 is possible, such as discs may be made circular and made concave or convex or any combination thereof. The head portion 110 consisting of the bristle portion 110b and the base portion 110a may be made of a polymer material such as rubber or plastic. The bristles 110c may have different grades of grit ranging from course to soft to buff. The bristles 110c in particular may be in the form of brushes, sponges, flexible combs and other abrasives. The bristles 110c may be made of suitable plastic (polyethylene (PE), high density PE (HDPE), medium density PE (MDPE), low density PE (LDPE), or any other type of plastic suitable for the intended purpose. Additionally, the bristles 110c are not be limited to plastic, but may be constructed from suitable natural materials, including but not limited to, fibers, hair, and any other type of natural brush-like fiber that would be suitable for the intended purpose. Additionally, the bristles 110c may be constructed from a combination of materials without departing from the scope and spirit of the present invention. In one embodiment, the bristles 110c present on the bristle portion 110b may be of plastic and the backing portion supporting bristles 110c may also be plastic. In another embodiment, the bristles 110c of the bristle portion 110b may be boar-hair or other natural material whereas the backing portion could be made of plastic. In an embodiment, the bristles 110c may be used in conjunction with a cleaning solution, soap and detergent, shampoo, germicidal or antiseptic.

Figure 5:
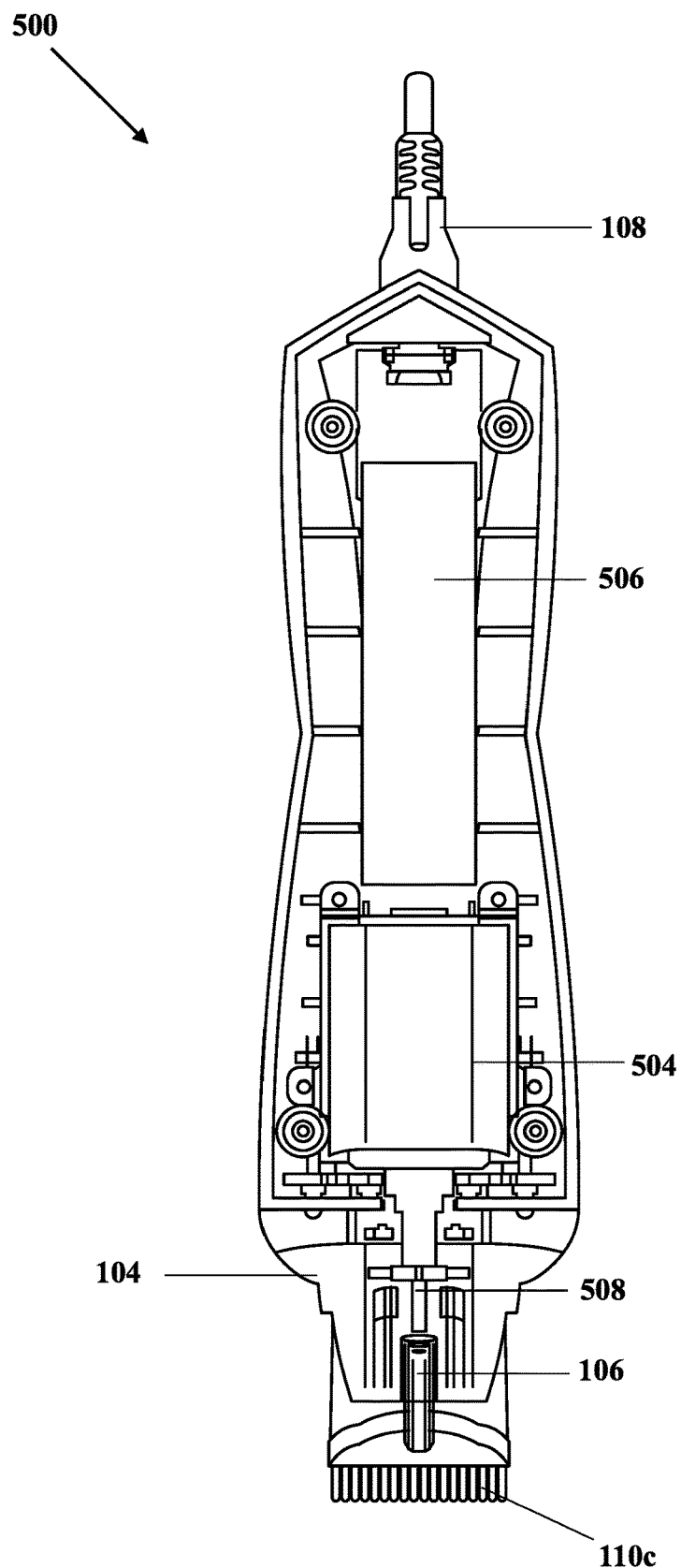
FIGS. 5 and 6 illustrate an inside view of the paw cleaning device as viewed from the front, in accordance with an embodiment of the present invention.
Figure 6:
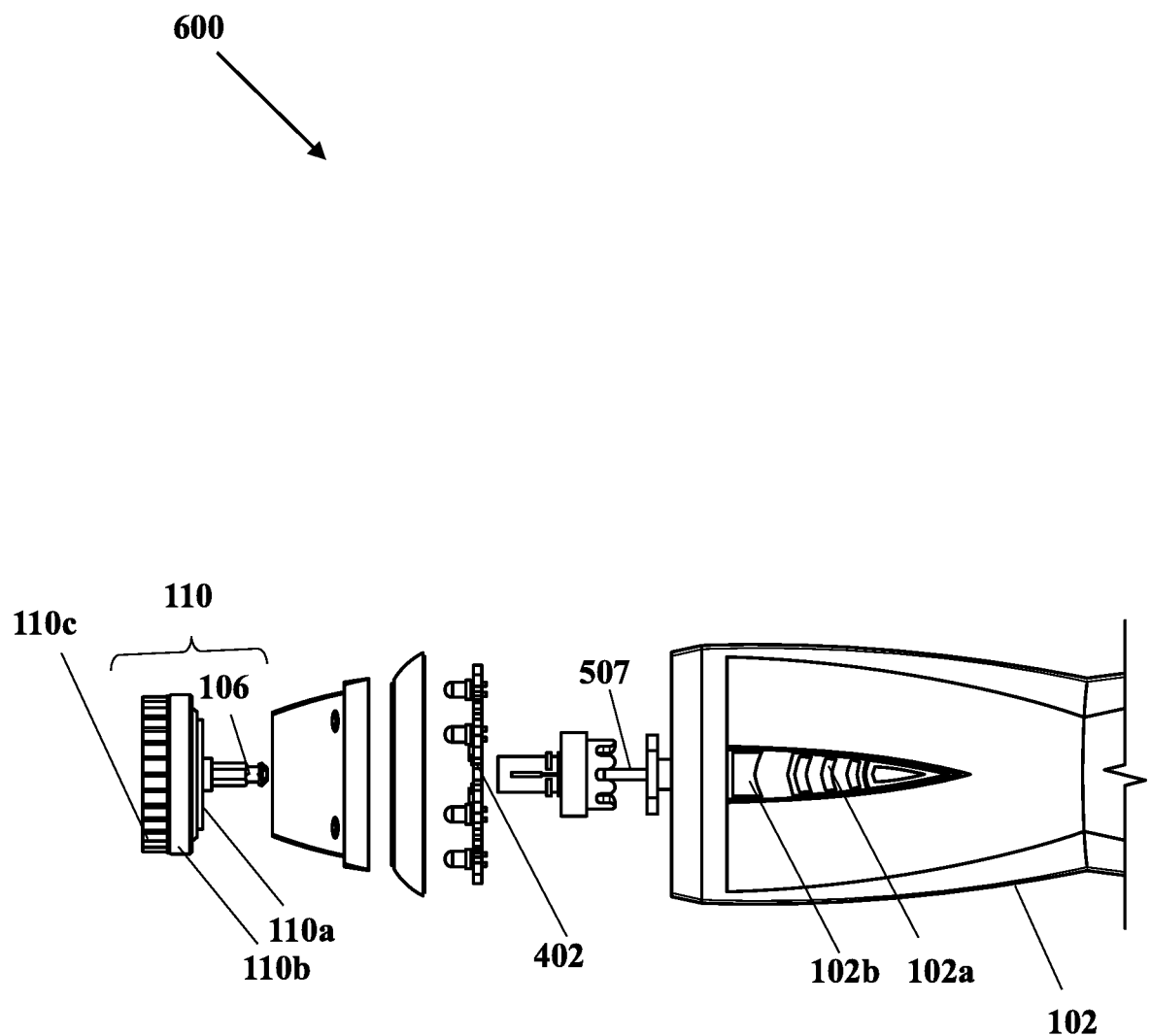

In an embodiment, the rotational speed of the head portion 110 including bristles 110c may be controlled by means of one or more motors 504 (as see in FIG. 5) that are housed or positioned inside the body portion 102 of the device 100. The one or more motors 504 may be removably positioned inside the device 100 to drive the head portion 110 including bristles 110c. Particularly, when the power switch of the power switch assembly 102a is turned ON (i.e., the power switch is at the second position or the third position), the one or more motors 504 are turned ON, which in turn rotates a shaft 507 (as seen in FIG. 6) associated with the motor 504, the rotation of the shaft 507 rotates a pin 508 (as seen in FIG. 6) connected to the shaft of the motor 504, rotation of the pin 508 in turn rotates the connecting pin 106 of the head portion 110, ultimately resulting in rotation of the head portion 110 having bristles 110c. In an embodiment, the one or more motors 504 may be configured to operate at two speeds i.e., at the medium speed and at the high speed. In an example, the medium speed may range from 1000 to 5000 revolutions per minute, and the high speed may range from 6000-10000 revolutions per minute. The speed of the one or more motors 504 may be controlled by operating the power switch of the power switch assembly 102a. For example, when the power switch is at the second position or at the third position, the one or more motors 504 are turned ON and accordingly operates at the defined medium speed or the defined high speed, which in turn rotates the head portion 110 including the bristles portion 110b having bristles 110c at the medium speed or at the high speed.

In FIG. 1, there is further shown an electrical charging or operating cable such as a power chord 108 that may be removably fixed to an input power supply terminal of the device 100. The input power supply terminal may be located at the top of the device 100. In one example, the power chord 108 may be utilized by a user to charge at least one battery 506 (as seen in FIG. 5) housed or positioned with the body portion 102 of the device 100. When connected, the power chord 108 may draw an electrical power from a mains power supply and supply the drawn electrical power to the battery 506 of the device 100 for charging the battery 506. Upon partial charging or complete charging of the battery 506 of the device 100, the user may utilize the device 100 for cleaning the paws of the pet animal. In another example, the power chord 108 may be utilized by the user to directly supply the electrical power from the mains power supply to device 100, and the user may utilize the device 100 for cleaning the paws of the pet animal. In another example, the power chord 108 may be utilized by the user for charging the battery 506 of the device 100 and cleaning the paws of the pet animal at the same time.

The body portion 102 may be designed such that the user can easily grasp and control the device 100 using a single hand. In one example, the body portion 102 is from 1" to 3" in diameter or width and 3" to 5" in length. The body portion 102 is tapered at its top to support connection to the head portion 110. In one embodiment, the body portion 102 contains a grip, allowing the user to securely hold the device 100 during cleaning the paws the pet animals. An actuation button (i.e., the power switch of the power switch assembly 102a) is positioned on the body portion 102. In use, the power switch controls the ON-OFF mechanism of the device 100. When turned on, the device's head portion 110 rotates either in clockwise or anticlockwise direction. Another actuation button (such as the light source switch 102b) controls the lighting source of the device 100, completing the internal circuit such that the lighting source turns on to provide halo-illumination in the pet's paws. As will be discussed later, the light source, when actuated, provides a halo-like illumination effect emanating from the device 100 to the paws of the pet animals.

In an embodiment, the paw cleaning device 100 includes an axis along which a rear half of the body portion 102 is removably fixed to the front half of the body portion 102. In one example, the rear half of the body portion 102 may be removed from the front half of the body portion 102 to replace the battery 506 or the one or more motors 504 of the device 100. In another example, the rear half of the body portion 102 may be removed from the front half of the body portion 102 to perform maintenance work with respect to at least the battery 506 or the one or more motors 504 of the device 100.

Figure 2:
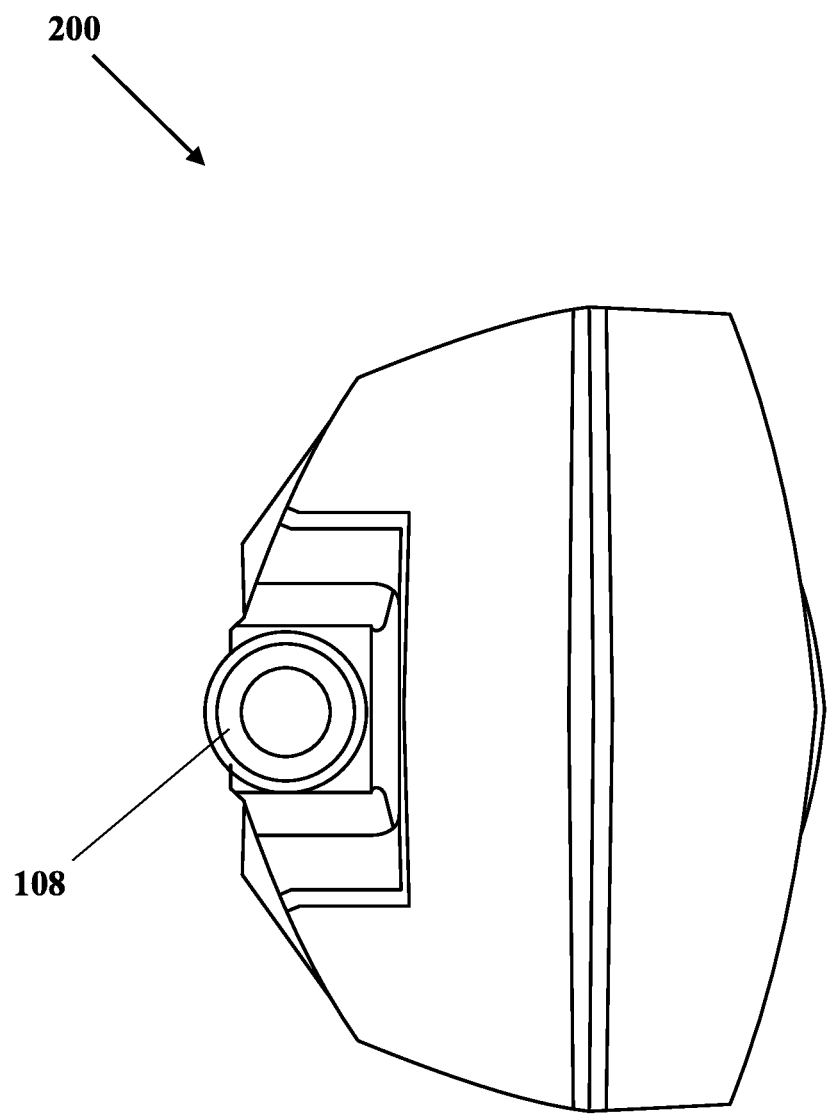
FIGS. 2 and 3 illustrate a top view and a bottom view of the paw cleaning device, in accordance with an embodiment of the present invention.
Figure 3:
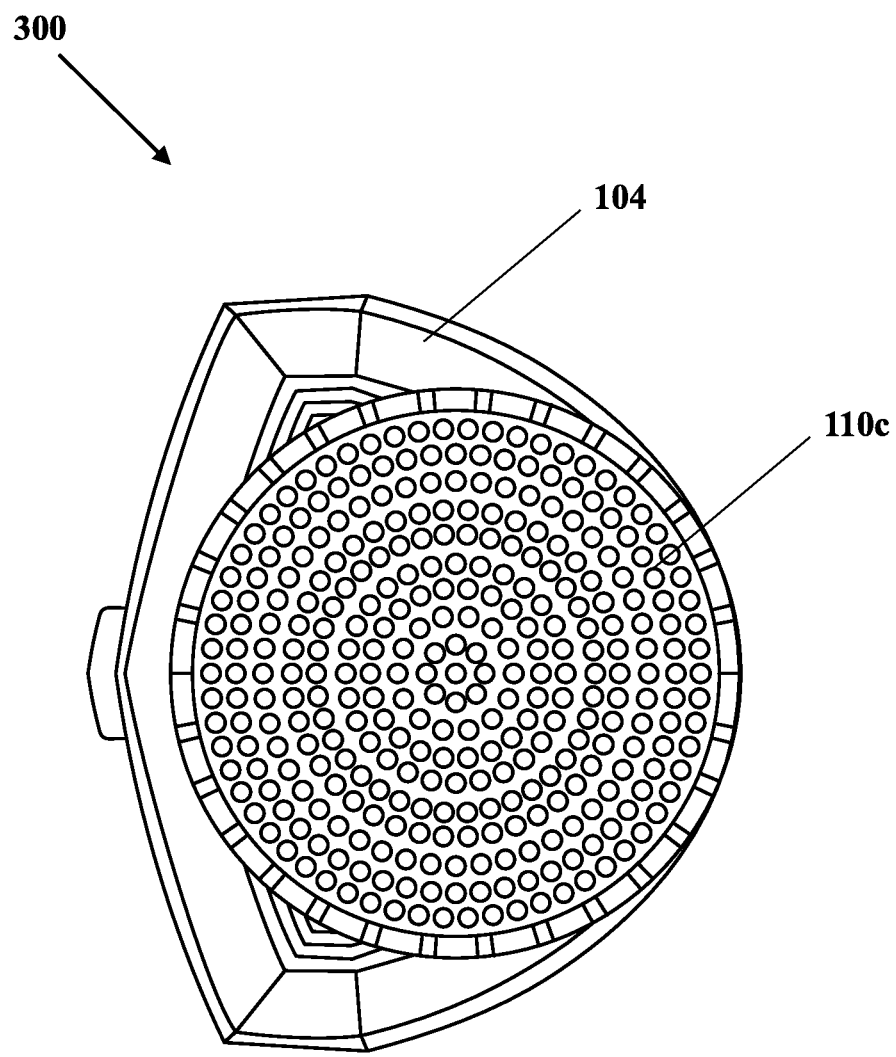

Referring to FIGS. 2 and 3, a top view 200 and a bottom view 300 of the paw cleaning device 100 are shown. In the top view 200 of the device 100 as shown in the FIG. 2, the power chord 108 has been shown as removably fixed or attached to the input power supply terminal of the device 100. The other end of the power chord 108 may be connected to the mains power supply to provide electrical power to the battery 506 of the device 100 for charging the battery 506 or to the one or more motors 504 of the device 100 for producing the rotational power, which in turn controls and manages the rotation of the top head portion 110 including bristles 110c.

Figure 4:
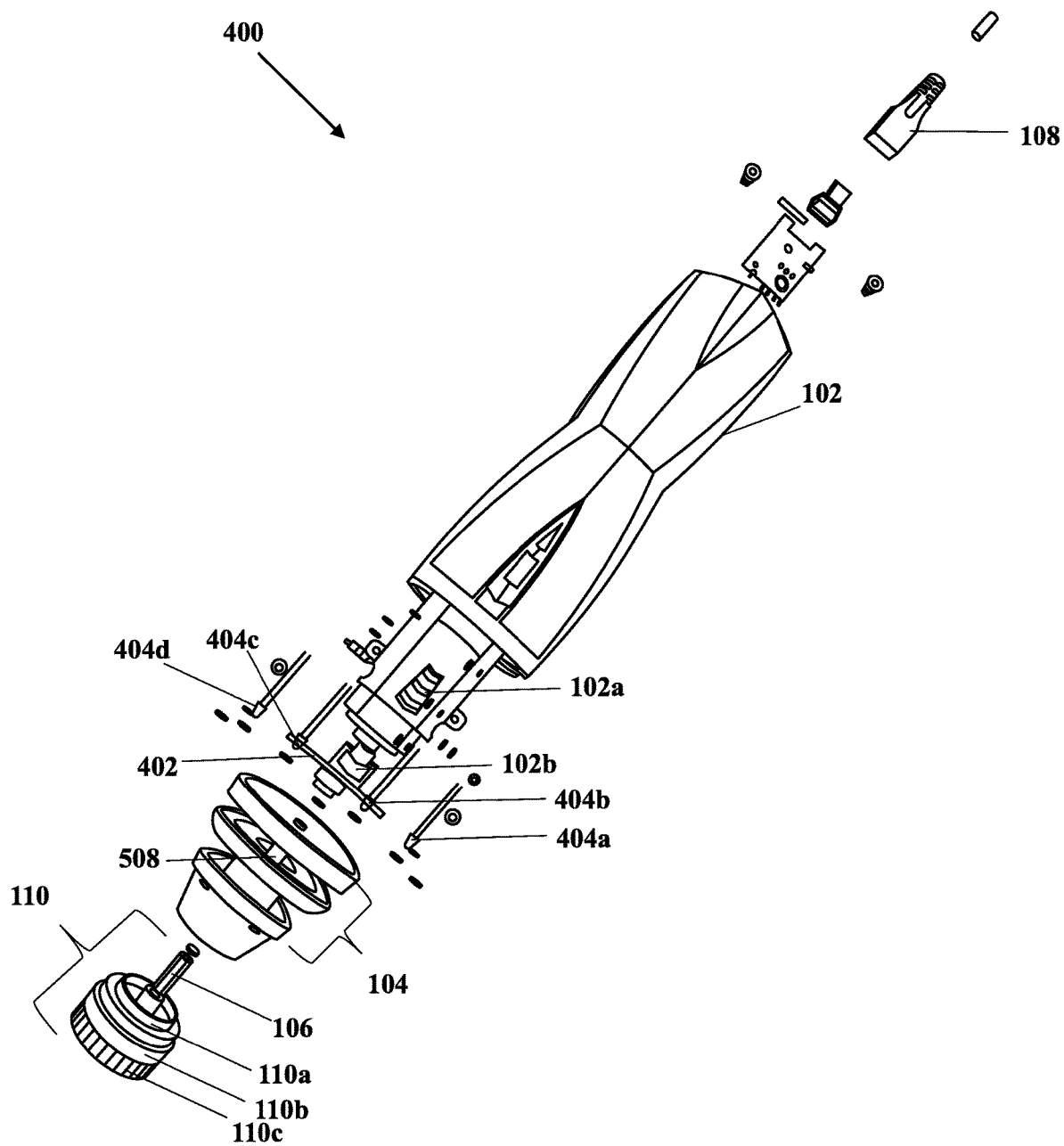
FIG. 4 illustrates a blown-up version of the paw cleaning device, in accordance with an embodiment of the present invention.

In the bottom view 300 of the device 100 as shown in the FIG. 3, the head portion (specifically the bristle portion 110b) has been shown that houses the bristles 110c. The bristles 110c may be made of different types of materials as described above. The bristles 110c may have different grades of grit ranging from course to soft to buff. When the one or more motors are tuned ON, a middle portion shaft or the pin 508 (as seen in FIG. 4) housed inside the middle portion (such as the light source portion 104) and physically connected to the shaft 507 (as seen in FIG. 6) of the one or more motors 504 by means of one or more internal channels or connectors starts rotating. The middle portion shaft/pin 508 housed inside the middle portion is rotatably attached to the head portion 110 including bristles 110c, and thus, as the middle portion shaft/pin 508 rotates, the head portion 110 including bristles 110c may rotate, and hence, the device 100 can be used for cleaning the paws of the pet animal such as a pet dog or a pet cat. The direction of rotation of the head portion 110 including bristles 110c may be proportional to the direction of rotation of the shaft 507 of the one or more motors 504. For example, if the shaft 507 of the motor 504 rotates in a clockwise direction, then the head portion 110 including bristles 110c may rotate in the clockwise direction. Similarly, if the shaft 507 of the motor 504 rotates in an anti-clockwise direction, then the head portion 110 including bristles 110c may rotate in the anti-clockwise direction. Alternatively, the device 100 may include a rotation controlling switch (not shown) that may be operated by the user to control the direction of rotation of the head portion 110 including bristles 110c. Alternatively, the device 100 may uniformly rotate in all direction due to the rotation of the shaft 507 of the motor 504.

In operation, the power switch of the power switch assembly 102a may be operated by the user to activate or deactivate (i.e., turn ON or turn OFF) the paw cleaner device 100. For example, the device 100 is in OFF state when the power switch is in the first position. In the first position, there is no power supply to the one or more motors of the device 100. Thus, the one or more motors are in OFF state.

As a result, the device 100 does not operate and the bristle portion 110*b* of the head portion 110 including bristles 110*c* does not rotate. In the second position, the power is being drawn either from the battery or the mains power supply and the drawn power is supplied to the one or more motors of the device 100. Thus, the one or more motors are in an ON state. As a result, the device 100 is turned ON and the head portion 110 including bristles 110*c* rotates at the medium speed. In the third position, the power is being drawn either from the battery or the mains power supply and the drawn power is supplied to the one or more motors of the device 100. Thus, the one or more motors are in an ON state. As a result, the device 100 is turned ON or remains in the ON state, and the head portion 110 including bristles 110*c* rotates at the high speed. During the operation of the device 100, the head portion 110 including bristles 110*c* rotates, the user may use the device 100 for cleaning different regions of the paws of the pet animal.

In an embodiment, the device 100 further includes the light source switch 102*b* that may be operated by the user to turn ON or turn OFF one or more LED's included in the light source portion 104. There are four modes of operating the light source switch 102*b*. In a first mode, when the light source switch 102*b* is pressed by the user, the front half of the light source portion 104 emits halogen light such as by means of one or more halogen light emitting LED's. In a second mode, when the light source switch 102*b* is pressed by the user, the rear half of the light source portion 104 emits halogen light such as by means of one or more halogen light emitting LED's. In a third mode, when the light source switch 102*b* is pressed by the user, the entire light source portion 104 emits light from all sides or directions such as by means of one or more halogen light emitting LED's. In a fourth mode, when the light source switch 102*b* is pressed by the user, all of the LED's (such as all of the halogen light emitting LED's) are turned OFF and do not emit any light.

Referring to FIG. 4, a blown-up version 400 of the paw cleaning device 100 is shown. The device 100 of the FIG. 4 shows various components, for example, the power switch assembly 102*a*, the light source switch 102*b*, the light source portion 104 (also referred as the middle portion for the purpose of this application), and the bristles 110*c* present on the head portion 110 consisting of the bristle portion 110*b* and the base portion 110*a*. The device 100 of the FIG. 4 shows an LED panel 402 and LED's 404*a*-404*d*. In an embodiment, the LED panel 402 may be used for holding the LED's 404*a*-404*d*. For example, the LED's 404*a*-404*d* are removably inserted into appropriate LED holes provided on the LED panel 402. Further, input terminals of each of the LED's 404*a*-404*d* are connected to a power supply unit such as the battery 506 of the device 100. The ON-OFF of each of the LED's 404*a*-404*d* may be associated with one or more modes of operation of the light source switch 102*b*. For example, in the first mode of the light source switch 102*b*, only few of the LED's 404*a*-404*d* such as the LED's 404*b* and 404*c* are turned ON and thus the front half of the LED panel 402 (including the LED's 404*b* and 404*c*) is lighted. In the second mode of the light source switch 102*b*, only few of the LED's 404*a*-404*d* such as the LED's 404*a* and 404*d* are turned ON and thus the rear half of the LED panel 402 (including the LED's 404*a* and 404*d*) is lighted. In the third mode of the light source switch 102*b*, all of the LED's 404*a*-404*d* are turned ON and thus the entire LED panel 402 (including the LED's 404*a*-404*d*) is lighted. In the fourth mode of the light source switch 102*b*, all of the LED's 404*a*-404*d* are turned OFF and thus the entire LED panel 402 (including the LED's 404*a*-404*d*) does not emit light.

In an embodiment, the LED panel 402 also includes an opening at its center that allows the shaft 507 (as seen in the FIG. 6) of the motor (positioned inside the device 100) to pass through it and make a contact with a cylindrical metallic material or middle portion shaft or pin 508 (such as a cylindrical brass pin, a cylindrical stainless-steel pin, or any other appropriate material). For example, the shaft 507 of the motor makes a physical contact with the first brass pin 508 included inside the device 100. The first brass pin 508 further makes another physical contact with a second brass pin referred to as the connecting pin 106 forming the part of the head portion 110 that connects the head portion 110 on top of the body portion 102. The bristles portion 110*b* having bristles 110*c* of the head portion 110 is removably attached (or removably makes physical contact) with the base portion 110*a*, which in turn is removably or fixedly attached to the pin 106 that connects the head portion 110 to the body portion 102. Thus, when the motor is turned ON, the shaft 507 of the motor rotates, which in turn rotates the pin 508 and the pin 106. Due to rotational motion of the pin 106, the head portion 110 having the bristles 110*c* attached thereto also rotates. The head portion 110 having the bristles 110*c* may rotate clockwise or anticlockwise. Such rotation of the bristles 110*c* may be utilized for cleaning various regions of the paws of the pet animals. In one example, the head portion 110 including the bristles 110*c* may only rotate along its axis and used for cleaning the paws of the pet animal. In another example, the head portion 110 including the bristles 110*c* may vibrates from one side to another side and used for cleaning different regions of the paws of the pet animal. In yet another example, the head portion 110 including the bristles 110*c* may rotate as well as vibrate for cleaning the paws of the pet animal.

Referring to FIGS. 5 and 6, inside views 500 and 600 of the paw cleaning device as viewed from the front is shown. In FIGS. 5 and 6, there is shown the middle portion or the light source portion 104, the bristles 110*c*, and the power chord 108. There is further shown the middle portion shaft or the pin 508, the motor 504, the battery 506, and the motor shaft 507. The middle portion shaft or pin 508 is housed inside the middle portion 104. One end of the pin 508 is connected to the motor shaft 507, and another end of the pin 508 is connected to the head portion 110 including the bristles 110*c* through the pin 106 using some connecting means or connectors that facilitates such connection. As shown, the motor 504 and the battery 506 are housed inside the device 100. The motor 504 may be powered by the battery 506. As described earlier, the physical connection between the motor shaft 507 with the pin or middle portion shaft 508, and the physical connection between the pin 508 with the pin 106 facilitates rotation of the head portion 110 (in fact the bristles 110*c*) that helps in cleaning the paws of the pets by the user.

Figure 7:
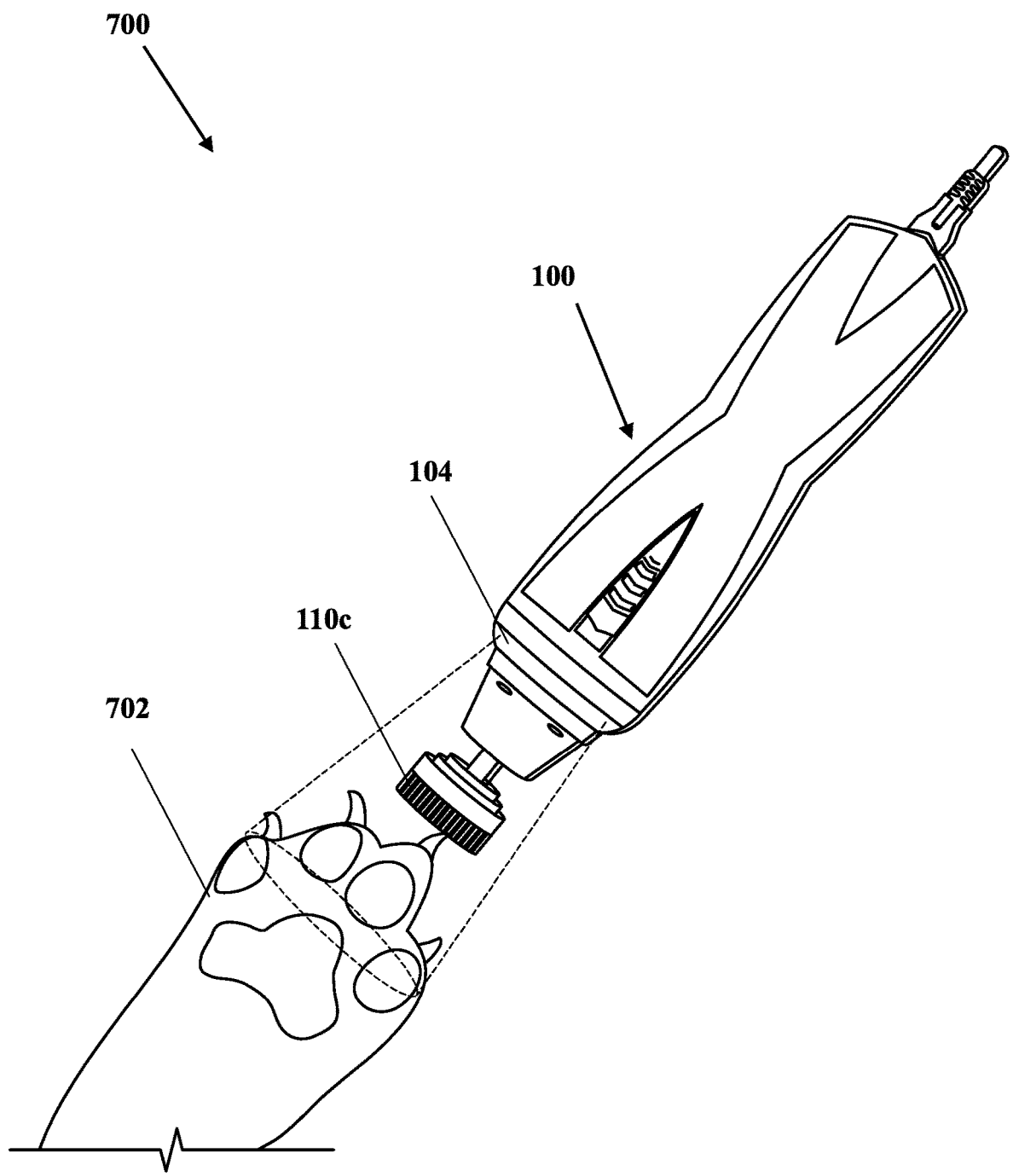
FIG. 7 shows an exemplary scenario for illustrating the usage of the a paw cleaning device for cleaning a dog's paw in the presence of halo-illumination lighting, in accordance with an embodiment of the present invention.

Referring to FIG. 7, an exemplary scenario 700 for illustrating the usage of the paw cleaning device 100 is shown, in accordance with an embodiment of the present invention. FIG. 7 shows the device 100 as used over the paw of a pet dog. Specifically, the FIG. 7 shows the device 100 as used over a paw pad region 702 of the paw of the dog. As shown, through the various features, including the bristles 110*c* of the device 100 and the halo-illumination (represented in the dotted form) from the lighting source portion 104, a pet groomer or pet owner can not only gain access to all regions of the pet's foot pad, but has sufficient visibility as well. The halo-illumination lighting effect such that a 360-degree light encircles the paw pad 702 region of the paw of the pet. This visibility offered by the device 100 during the paw cleaning process helps the pet owner or groomer to analyze health conditions of their pet.

Although particular embodiments of the invention have been described in detail for purposes of illustration, various modifications and enhancements may be made without departing from the spirit and scope of the invention.

What is claimed is:

1. A paw cleaning device for a pet animal, comprising:
a body portion, having at least one power switch (and at least one light source switch,
a light source portion for providing halo-illumination lighting, and
a head portion comprising a bristle portion having a plurality of bristles, a base portion, and a connecting pin;
wherein the at least one power switch having at least three switch positions for controlling rotational speed of the plurality of bristles of the paw cleaning device, and
the at least one light source switch having at least four modes for controlling the halo-illumination lighting that is used during cleaning of a paw of the pet animal.

2. The paw cleaning device of claim 1, wherein the at least three switch positions of the at least one power switch for controlling rotational speed of the plurality of bristles of the paw cleaning device comprising a first position for switching off the plurality of bristles such that the plurality of bristles are in a motionless state, a second position for switching on the plurality of bristles such that the plurality of bristles operate at a medium speed, and a third position for switching on the plurality of bristles such that the plurality of bristles operate at a high speed.

3. The paw cleaning device of claim 1, wherein the at least four modes of the at least one light source switch for controlling illumination of the light source portion comprising a first mode that illuminates one or more LED's located within a front half of the light source portion, a second mode that illuminates one or more LED's located within a rear half of the light source portion, a third mode that illuminates the one or more LED's in both front and rear halves of the light source portion, and a fourth mode that deactivates the one or more LED's in the light source portion.

4. The paw cleaning device of claim 3, wherein the front half of the light source portion comprises at least one halogen light emitting LED that is turned on when the at least one light source switch is in the first mode.

5. The paw cleaning device of claim 3, wherein the rear half of the light source portion comprises at least one halogen light emitting LED that is turned on when the at least one light source switch is in the second mode.

6. The paw cleaning device of claim 3, wherein the light source portion comprising one or more halogen light emitting LED's that are entirely turned on when the at least one light source switch is in the third mode.

7. The paw cleaning device of claim 3, wherein the light source portion comprises one or more halogen light emitting LED's that are entirely turned off when the at least one light source switch is in the fourth mode.

8. The paw cleaning device of claim 1, wherein the at least one power switch and the at least one light source switch are included on a front surface of an upper body portion of the body portion of the paw cleaning device.

9. The paw cleaning device of claim 1, wherein the connecting pin of the head portion is configured to removably or fixedly connect the head portion to the body portion of the paw cleaning device.

10. The paw cleaning device of claim 1, wherein the bristle portion having the plurality of bristles is removably or fixedly connected to the base portion.

11. The paw cleaning device of claim 1, wherein the light source portion is positioned between the upper body portion of the paw cleaning device and the head portion of the paw cleaning device.

12. The paw cleaning device of claim 1, wherein the plurality of bristles of the head portion is driven by means of at least one motor positioned inside the body portion of the paw cleaning device, and wherein the at least one motor is powered by a battery also positioned within the body portion of the paw cleaning device.

13. The paw cleaning device of claim 1, wherein the plurality of bristles are driven by means of the at least one motor positioned inside the body portion of the paw cleaning device, and wherein the at least one motor is powered by an external power supply connected to the at least one motor by means of a power cord chord.

* * * * *

UNITED STATES PATENT AND TRADEMARK OFFICE
CERTIFICATE OF CORRECTION

PATENT NO. : 11,412,839 B2
APPLICATION NO. : 16/390250
DATED : August 16, 2022
INVENTOR(S) : Naftoli Jacobowitz Page 1 of 1

It is certified that error appears in the above-identified patent and that said Letters Patent is hereby corrected as shown below:

In the Claims

At Column 12, Claim 13, Line 37, "driven by means of the at least one" should read -- driven by means of at least one --

At Column 12, Claim 13, Line 41, "power cord chord" should read -- power cord --

Signed and Sealed this
Twenty-seventh Day of August, 2024

Katherine Kelly Vidal
*Director of the United States Patent and Trademark Office*